(12) United States Patent
Saito

(10) Patent No.: US 6,508,736 B2
(45) Date of Patent: Jan. 21, 2003

(54) SHIFT CONTROL APPARATUS FOR AUTOMATIC TRANSMISSION

(75) Inventor: Yuji Saito, Shizuoka (JP)

(73) Assignee: Jatco Transtechnology, Ltd., Fuji (JP)

( * ) Notice: Subject to any disclaimer, the term of this patent is extended or adjusted under 35 U.S.C. 154(b) by 0 days.

(21) Appl. No.: 09/953,967

(22) Filed: Sep. 18, 2001

(65) Prior Publication Data
US 2002/0035011 A1 Mar. 21, 2002

(30) Foreign Application Priority Data
Sep. 18, 2000 (JP) .................................. 2000-282341

(51) Int. Cl.[7] .............................................. F16H 31/00
(52) U.S. Cl. ...................................................... 475/123
(58) Field of Search ................................. 475/123, 127

(56) References Cited

U.S. PATENT DOCUMENTS

| | | | |
|---|---|---|---|
| 5,382,201 A | * 1/1995 | Iizuka | 475/123 |
| 5,411,451 A | 5/1995 | Ando et al. | 477/144 |
| 6,098,003 A | * 8/2000 | Kozaki et al. | 701/51 |

FOREIGN PATENT DOCUMENTS

JP   5-157167   6/1993

OTHER PUBLICATIONS

U.S. patent application Ser. No. 09/936,811, Murasugi et al., filed Sep. 18, 2001.
U.S. patent application Ser. No. 09/953,937, Saito, filed Sep. 18, 2001.
U.S. patent application Ser. No. 09/953,893, Tanaka et al., filed Sep. 18, 2001.
U.S. patent application Ser. No. 09/953,895, Saito, filed Sep. 18, 2001.
U.S. patent application Ser. No. 09/953,936, Kato, filed Sep. 18, 2001.
U.S. patent application Ser. No. 09/953,966, Saito, filed Sep. 18, 2001.
U.S. patent application Ser. No. 09/953,968, Saito, filed Sep. 18, 2001.
U.S. patent application Ser. No. 09/953,969, Saito, filed Sep. 18, 2001.
U.S. patent application Ser. No. 09/953,972, Saito, filed Sep. 18, 2001.
U.S. patent application Ser. No. 09/954,017, Murasugi et al., filed Sep. 18, 2001.
U.S. patent application Ser. No. 09/954,019, Saito, filed Sep. 18, 2001.
U.S. patent application Ser. No. 09/954,298, Saito, filed Sep. 18, 2001.

* cited by examiner

Primary Examiner—Dirk Wright
(74) Attorney, Agent, or Firm—Foley & Lardner

(57) ABSTRACT

In a replacement gear shift effected by engagement of a first friction engagement element by increasing a first fluid pressure and instead by disengagement of a second friction engagement element by decreasing a second fluid pressure, a shift control apparatus forcibly increases the first fluid pressure at a gradual rate to prevent an undesired shift shock if the inertia phase does not end within a predetermined time.

8 Claims, 6 Drawing Sheets

FIG.2

| | R/C | H/C | L/C | LR/B | L/OWC | 2-4/B |
|---|---|---|---|---|---|---|
| 1st | | | ○ | (○) | ○ | |
| 2nd | | | ○ | | | ○ |
| 3rd | | ○ | ○ | | | |
| 4th | | ○ | | | | ○ |
| Rev | ○ | | | ○ | | |

SHIFT CONTROL APPARATUS FOR AUTOMATIC TRANSMISSION

BACKGROUND OF THE INVENTION

The present invention relates to a shift control apparatus for an automatic transmission and more particularly to a shift control apparatus to govern a shift operation to effect a replacement gear shift by engaging a first friction engagement element by increasing a first fluid pressure and instead by disengaging a second friction engagement element by decreasing a second fluid pressure within a predetermined time interval in response to a pressure signal related to the first fluid pressure of the first friction engagement element.

An automatic transmission is configured to decide a drive path (or speed) of a toque transmission train by selectively actuating (engagement) friction engagement elements such as a plurality of clutches and brakes and to effect a gear shift by switching a friction engagement element to be engaged.

The automatic transmission effects a so-called replacement shift operation by engaging a first friction engagement element by increasing a first fluid pressure and instead by disengaging a second friction engagement element by decreasing a second fluid pressure. In this description, a friction engagement element to be changed from the engaged state to the disengaged state in the replacement shift operation and the operating fluid pressure are referred to as a disengagement side friction element and a disengagement side fluid pressure, respectively. A friction engagement element to be changed from the disengaged state to the engaged state and the operating fluid pressure are referred to as an engagement side friction element and an engagement side fluid pressure, respectively.

A published Japanese patent application Publication (Kokai) No. 5(1993)-157167 show a conventional shift control apparatus to control a replacement shift operation to effect a gear shift by engaging the engagement side friction element by increasing the engagement side fluid pressure and instead by disengaging the disengagement side friction element by decreasing the disengagement side fluid pressure in a manner to prevent a shift shock.

In the above-mentioned apparatus, a pressure regulating device holds the engagement side fluid pressure at a predetermined level until the engine speed (input speed) reaches a predetermined speed, and then increases the engagement side fluid pressure in accordance with the engine torque (input torque), so as to prevent a sudden change in the input speed, to vary the torque shares between the engagement side friction element and the disengagement side friction element smoothly and specifically to reduce a shift shock on a downshift.

SUMMARY OF THE INVENTION

An object of the first invention is to provide a shift control apparatus and process to vary a fluid pressure adequately to prevent shift shock when the shift operation is terminated forcibly.

According to the present invention, a shift control apparatus for an automatic transmission comprising first and second friction engagement elements to be selectively engaged and disengaged to select one of gear ratios, comprises at least a shift controller configured: to govern a first shift operation to effect a first gear shift by engaging the first friction element by increasing a first fluid pressure and instead by disengaging the second friction element by decreasing a second fluid pressure; to measure a time from a start of an inertia phase in the first gear shift; to check if an end of the inertia phase is not detected within a predetermined first time interval from the start of the inertia phase; and to forcibly increase the first fluid pressure at a predetermined gradual rate if an end of the inertia phase is not detected within the predetermined first time interval from the start of the inertia phase.

The other objects and features of this invention will become understood from the following description with reference to the accompanying drawings.

BRIEF DESCRIPTION OF THE DRAWINGS

FIG. 2 is a table showing the relation between the selected gear positions of the automatic transmission and the engagement logic of friction engagement elements.

DETAILED DESCRIPTION OF THE INVENTION

Figure 1:
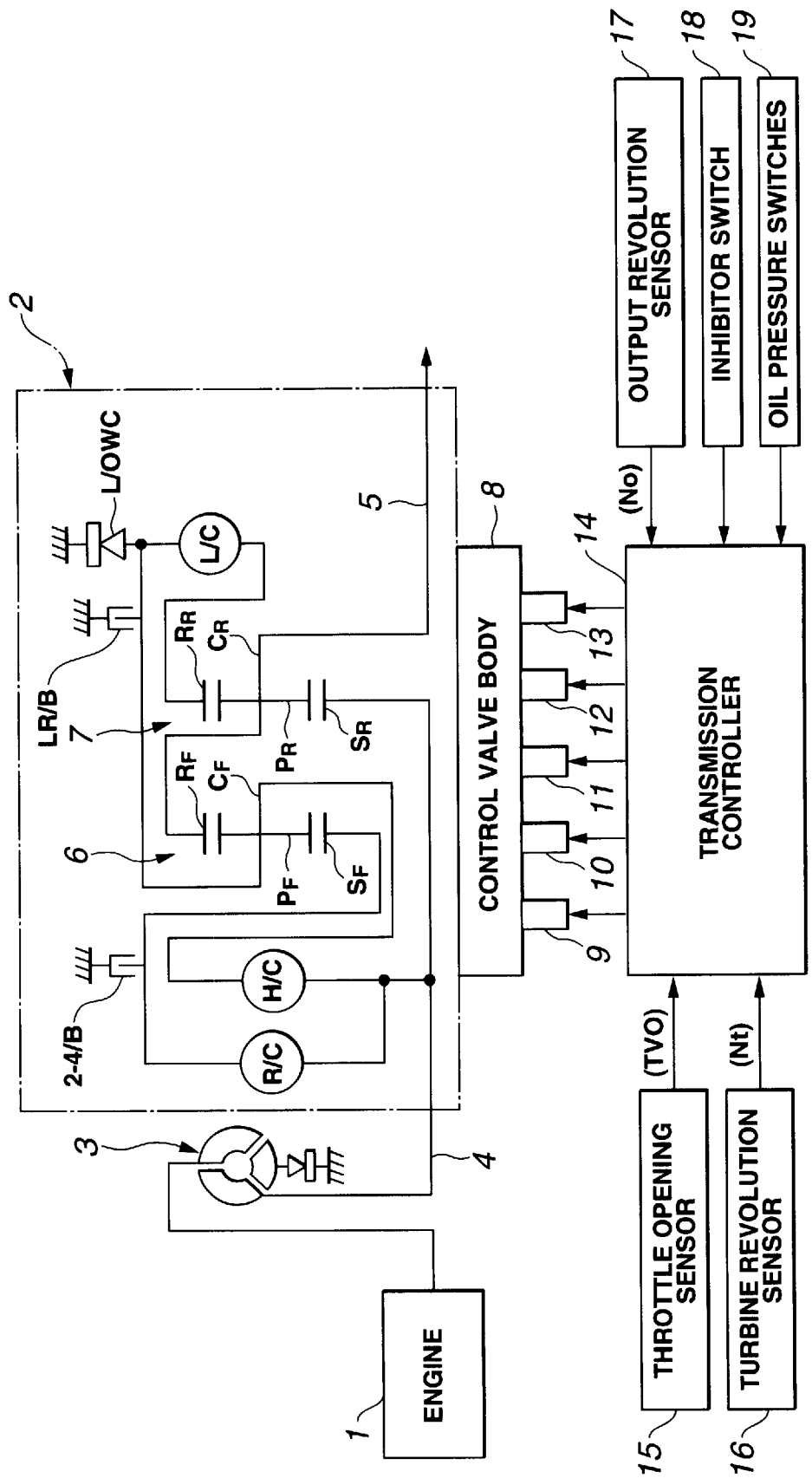
FIG. 1 is a schematic view showing a shift control system according to one embodiment of the present invention.

FIG. 1 shows a shift control system according to a first embodiment of the present invention, including an engine 1 and an automatic transmission 2.

In accordance with driver's depression of an accelerator pedal, a throttle valve varies its opening from a fully closed state to a fully open state, and thereby regulates the output of engine 1. Output rotation of engine 1 is transmitted through a torque converter 3 to an input shaft 4 of the automatic transmission 2.

In transmission 2, front and rear planetary gear sets 6 and 7 are mounted on input and output shafts 4 and 5 which are aligned end to end. Front planetary gear set 6 is located on a front side closer to engine 1. Front and rear planetary gear sets 6 and 7 are main components of a planetary speed change mechanism of automatic transmission 2.

Front planetary gear set 6 is a simple planetary gear set including a front sun gear $S_F$, a front ring gear $R_F$, front pinions $P_F$ engaging with the front sun and ring gears, and a front planet carrier $C_F$ supporting front pinions $P_F$ rotatably. Rear planetary gear set 7 is also a simple planetary gear set including a rear sun gear $S_R$, a rear ring gear $R_R$, rear pinions $P_R$ engaging with the rear sun and rear gears, and a rear carrier $C_R$ supporting rear pinions $P_R$ rotatably.

As friction elements (or devices) to determine a drive path (or speed) in the planetary gear train, there are a low clutch L/C, a 2–4 speed brake 2–4/B, a high clutch H/C, a low reverse brake LR/B, a low one-way clutch L/OWC, and a reverse clutch R/C.

The reverse clutch R/C is connected between front sun gear $S_F$ and input shaft 4 to selectively connect the front sun gear $S_F$ with input shaft 4. The 2–4 speed brake 2–4/B is disposed between front sun gear $S_F$ and a casing to hold front sun gear $S_F$ selectively. The high clutch H/C is connected between front planet carrier $C_F$ and input shaft 4 for selective connection therebetween. The low one-way clutch L/OWC is disposed between front planet carrier $C_F$ and the casing to prevent reverse rotation of the front planet carrier $C_F$ opposite to the rotational direction of the engine. The low reverse brake LR/B is arranged to hold the front planet carrier $C_F$ selectively. The low clutch L/C is connected between front planet carrier $C_F$ and rear ring gear $R_R$ for selective connection therebetween. Output shaft 5 is connected with front ring gear $R_F$ and rear planet carrier $C_R$ which are connected together. Rear sun gear $S_R$ is connected with input shaft 4.

Figure 2:
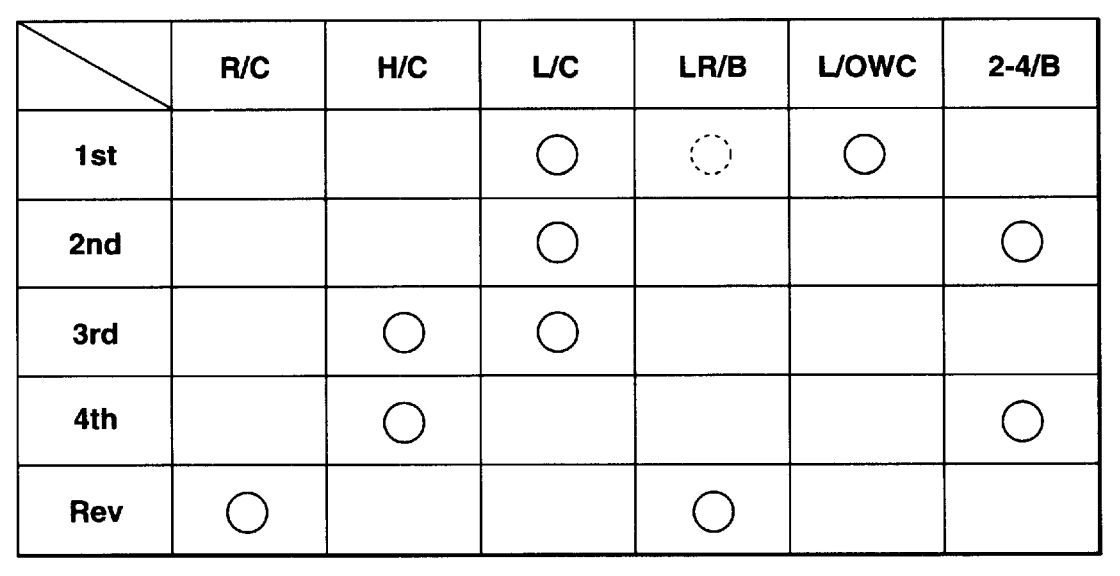

The thus-constructed planetary gear train can provide a first forward speed (1st), a second forward speed (2nd), a third forward speed (3rd), a fourth forward speed (4th) and a reverse speed (Rev), by selective oil pressure actuation (engagement) shown by solid line circles in FIG. 2 of the five friction elements R/C, H/C, L/C, LR/B, and 2–4/B, and self engagement of low one-way clutch L/OWC shown by a solid line circle. A broken line circle in FIG. 2 indicates oil pressure actuation (or engagement) to effect engine braking.

A control valve body 8 includes a hydraulic control circuit to achieve the engagement logic shown in FIG. 2, of the shift control friction elements L/C, 2–4/B, H/C, LR/B, and R/C. In addition to manual valve (not shown), the control valve body 8 has a line pressure solenoid 9, a low clutch solenoid 10, a 2–4 speed brake solenoid 11, a high clutch solenoid 12 and a low reverse brake solenoid 13.

The line pressure solenoid 9 changes the line pressure as a source pressure of the shift control between high and low levels by its on and off operation. The manual valve is operated by the driver among a forward drive range position (D), a reverse range position (R), and park and stop range positions (P, N).

In D range, the manual valve supplies the above-mentioned line pressure as a D range pressure to the low clutch solenoid 10, the 2–4 brake solenoid 11, the high clutch solenoid 12 and the low reverse brake solenoid 13. Each of the solenoids 10~13 reduces the line pressure directed to the corresponding one of the low clutch L/C, the 2–4 speed brake 2–4/B, the high clutch H/C and the low reverse brake LR/B, in accordance with the solenoid pressure generated by the duty control from the above-mentioned D range pressure. Thus, the solenoids 10~13 can regulate the operating fluid pressures of these friction engagement elements individually, and the shift control system can achieve the engagement logic from first gear to fourth gear shown in FIG. 2 by the duty control of solenoids 10~13.

In R range, the manual valve supplies the line pressure directly to the reverse clutch R/C independently of the duty control of each solenoid and supplies the oil pressure controlled by the duty control of the low reverse brake solenoid 13 to the low reverse brake LR/B to put into engagement. Thus, the engagement logic for reverse operation shown in FIG. 2 is achieved.

In P and N ranges, the manual valve is in a state supplying the line pressure to none of the circuits and thereby puts the automatic transmission in a neutral position, by disengaging all the friction elements.

A transmission controller 14 controls the line pressure solenoid 9 in the on/off control mode, and controls the low clutch solenoid 10, 2–4 speed brake solenoid 11, high clutch solenoid 12 and low reverse brake solenoid 13 in the duty control mode in accordance with input information supplied from the following input devices.

A throttle opening sensor 15 senses a throttle opening (degree) TVO of the engine 1. A turbine revolution sensor (or input revolution sensor) 16 senses a turbine revolution speed Nt which is an output revolution speed of the torque converter 3 (i.e., the transmission input revolution speed). An output revolution sensor 17 senses a revolution speed No of the output shaft 5 of the automatic transmission 2. An inhibitor switch 18 senses a selected range.

Oil pressure switches 19 are disposed in engagement side friction elements to be engaged in replacement shifts. As shown in FIG. 2, the engagement side friction element is the high clutch H/C in the case of 2–3 shift from 2nd gear speed to 3rd gear speed, the 2–4 brake when 3–2 shift, the 2–4 brake in the case of 3–4 shift, and the low clutch L/C in the case of 4–3 shift. The signals are supplied from oil pressure switches 19 to controller 14. In each friction engagement element, the pressure switch 19 is turned on when the fluid pressure reaches a pressure level to end a loss stroke and to start to produce an engagement capacity.

By performing a control program, the transmission controller 14 determines a desired speed for a current driving condition in accordance with the throttle opening (degree) TVO and the transmission output speed No (that is, the vehicle speed) from a predetermined control map. Then, the controller 14 examines whether the currently selected actual speed is identical to the desired speed. If it is not, the controller 14 produces a shift command, and effects a shift from the actual speed to the desired speed by varying the fluid pressures to change the engagement states of the friction elements according to the engagement logic of FIG. 2 by the duty control of the solenoids 10~13.

Figure 3:
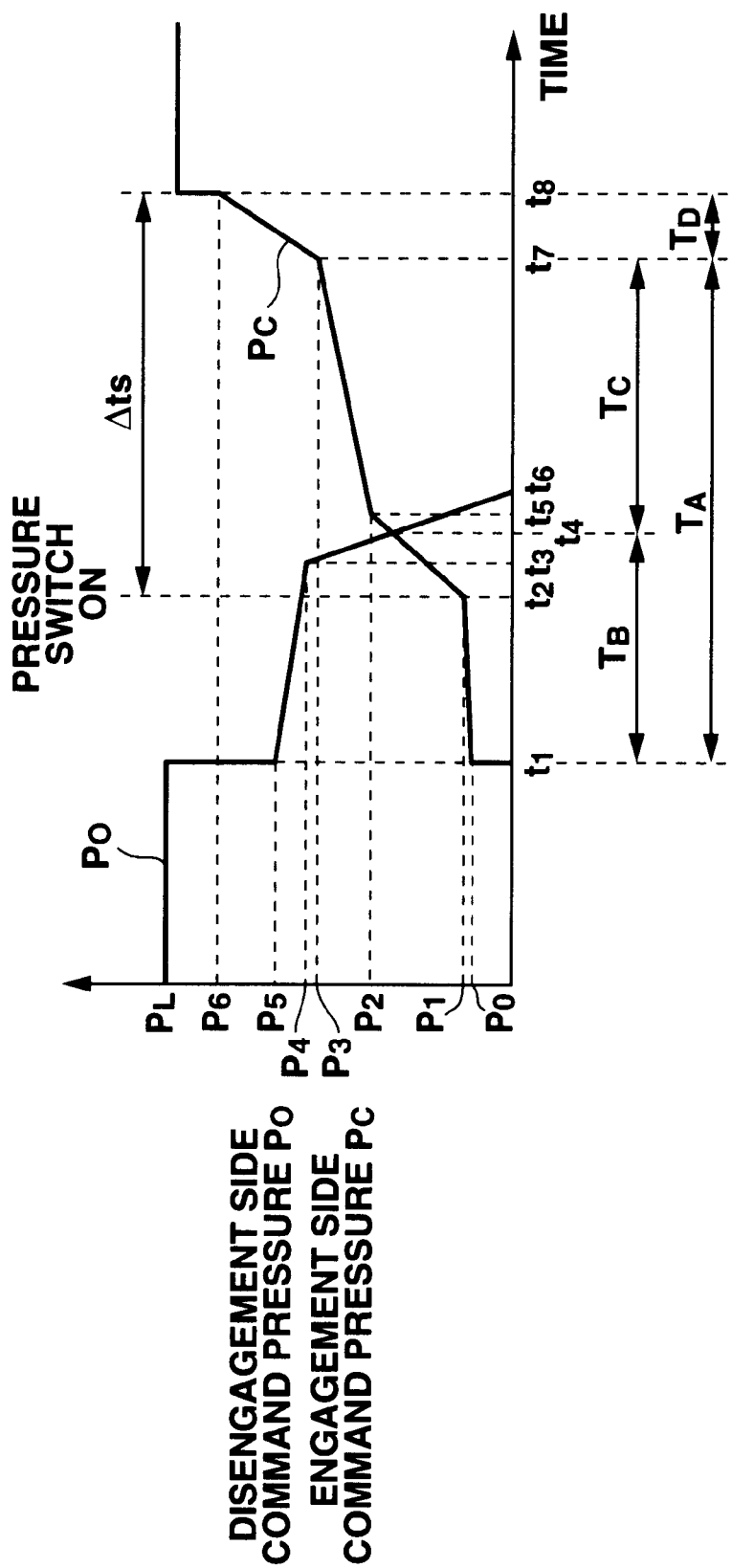
FIG. 3 is a time chart showing how the engagement side command fluid pressure and the disengagement side command fluid pressure are controlled with time in a replacement shift.

In a so-called replacement shift, such as 2–3 shift or 3–4 shift, achieved by engagement of one element and disengagement of another, this control system decreases a command fluid pressure Po for a first friction element (referred to as a disengagement side command friction element) to disengage the first friction element in a pattern shown in FIG. 3, and increases a command fluid pressure Pc for a second friction element (referred to as an engagement side command friction element) to engage the second friction element in a pattern as shown in FIG. 3 in the case of upshifting due to an increase of the vehicle speed in the forward driving state (driving state opposite to the engine braking), for example.

The shift control apparatus according to the present invention utilizes a timer to measure an elapsed time from a shift command instant t1 shown in FIG. 3 at which a shift command is produced, and compares the measured elapsed time with a predetermined value, thereby to check if the replacement shift operation is in order. In this example, the shift control apparatus measures a (command-to-end) time from a shift command instant t1 to an inertia phase end detection instant t7 at which an end of the inertia phase is detected, a (command-to-start) time from the shift command instant t1 to an inertia phase start detection instant t4 at which a start of the inertia phase is detected, and a (start-to-end) time from the inertia phase start detection instant t4 to the inertia phase end detection instant t7 with timers, and compares the measured times, respectively, with first, second and third predetermined amounts $T_A$, $T_B$ and $T_C$.

Figure 4:
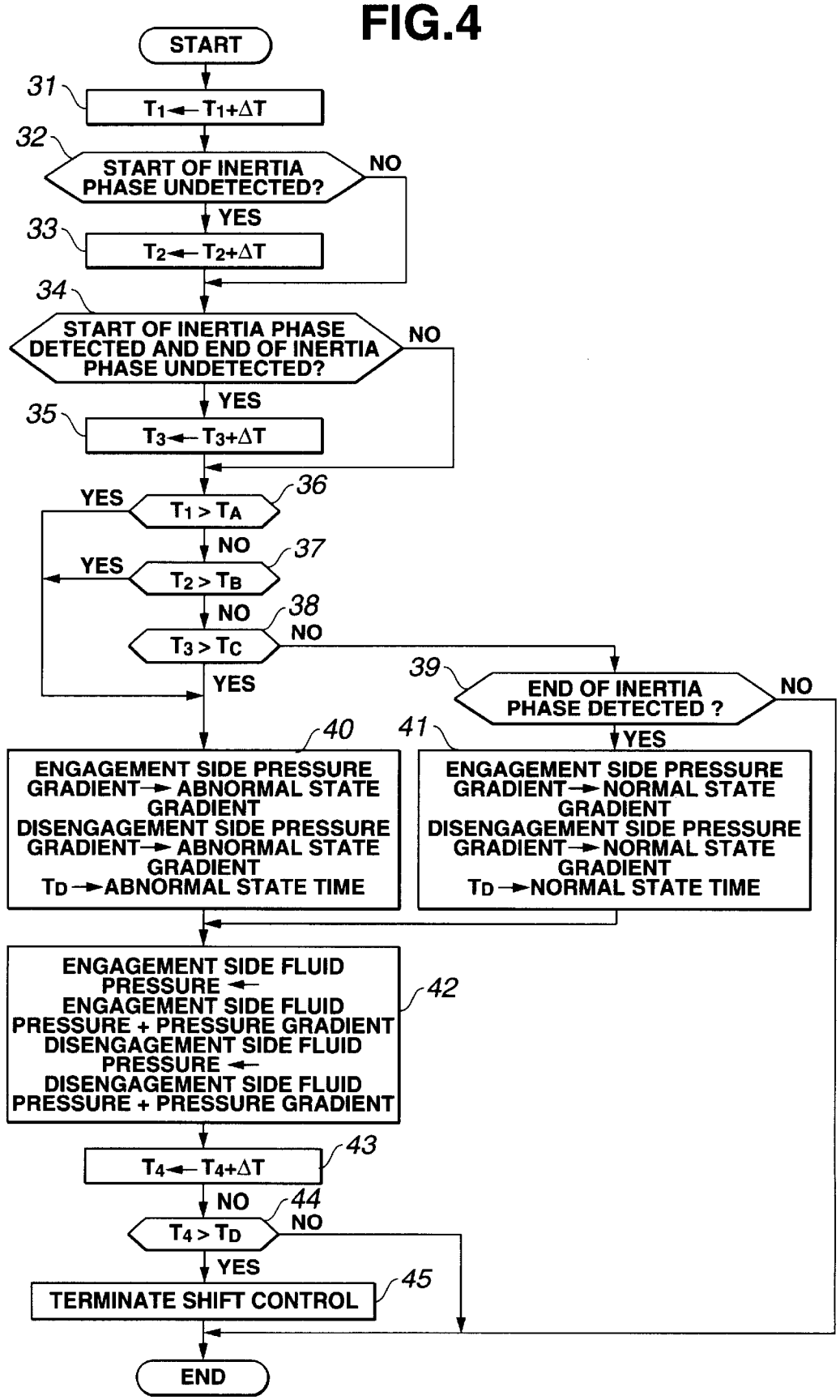
FIG. 4 is a flowchart showing a program for the shift control system of FIG. 1 to monor a replacement shift operation and to perform an operation to terminate the shift operation in dependence of the result of examination.

A program shown in FIG. 4 is designed to check if the shift control operation is performed correctly within a normal range of time interval by using the values of the above-mentioned timers and to perform an end process for terminating the shift control in accordance with the result.

First, step 31 shown in FIG. 4 is a step to add a predetermined incremental time ΔT to a variable T1 (T1←T1+ΔT) to count an elapsed time. The variable T1 is used to determine a time from the shift command instant t1 to the inertia phase end detection instant t7 as described later.

Next step 32 checks if a start of the inertia phase is not yet detected. If a start of an inertia phase is undetected, and hence the answer of step 32 is YES, the routine proceeds to step 33. If a start of an inertia phase is detected and hence the answer of step 32 is NO, the routine proceeds to step 34.

Step 33 increases a variable T2 by the predetermined incremental time ΔT (T2←T2+ΔT) to measure an elapsed time. The variable T2 is to determine a time from the shift command instant t1 to the inertia phase start instant t4 as described later.

Next step 34 is to check if a start of an inertia phase is detected and an end of the inertia phase is not detected. If the inertia phase is started but not yet ended, and hence the answer of step 34 is YES, the routine proceeds to step 35. If at least one of the two conditions of step 34 (detection of inertia phase start and non-detection of inertia phase end) is not satisfied, the routine proceeds to step 36.

Step 35 increases a variable T3 by the predetermined incremental time ΔT (T3←T3+ΔT) to measure a time from the inertia phase start instant t4 to the inertia phase end instant t7.

Step 36 is a first abnormality checking step to compare the variable T1 representing the time interval from the shift command instant t1 to the inertia phase end instant t7, with the predetermined value $T_A$, to examine if the shift operation is performed within a normal range of time. If the time interval T1 is more than the predetermined value $T_A$ (T1>$T_A$), it is determined that the shift operation has not ended within the normal range of time and the routine proceeds to step 40. If the time interval T1 is less than or equal to the predetermined value $T_A$, it is determined that the shift has ended within the normal range of time and the routine proceeds to step 37. The affirmative answer of step S36 corresponds to an abnormal condition signal indicating the detection of an abnormal condition.

Step 37 is a second abnormality checking step to compare the variable T2 representing the time interval from the shift command instant t1 to the inertia phase start instant t4, with the predetermined value $T_B$ to check if the shift is performed normally. If the time interval T2 is more than the predetermined value $T_B$ (T2>$T_B$), it is determined that the shift operation has not ended normally and the routine proceeds to step 40. If the time interval T2 is less than or equal to the predetermined value $T_B$, it is judged that the shift has ended normally and the routine proceeds to step 38. The affirmative answer of step S37 corresponds to a second abnormal condition signal indicating the detection of an abnormal condition.

Step 38 is a third abnormality checking step to check if the variable T3 representing the time interval from the inertia phase start instant t4 to the inertia phase end instant t7, is more than the predetermined value $T_C$. If the time interval T3 is more than the predetermined value $T_C$, it is determined that the shift operation has not ended normally and the routine proceeds to step 40. If the time interval T3 is less than or equal to the predetermined value $T_C$, it is judged that the shift operation has ended normally and the routine proceeds to step 39.

Step 39 checks if the inertia phase has ended. In this example, the controller 14 judges that the inertia phase comes to an end when the ratio between the input revolution speed and the output revolution speed becomes less than a predetermined value. If the inertia phase has ended, the routine proceeds to step 41. If the inertia phase has not ended yet, the controller 14 terminates the current execution of the routine.

Step 40 is designed to set a control characteristic for an abnormal state control mode to forcibly end the shift control operation by decreasing the disengagement side fluid pressure and increasing the engagement side fluid pressure when an abnormal condition is detected in step 36, 37 or 38. In this example, step 40 sets a pressure gradient a to a value α1 for the abnormal state control mode. As shown as an example in FIG. 5, this shift control system starts the forcible increase of the engagement side fluid pressure $P_C$ at the gradient α1 when the elapsed time exceeds the time interval $T_C$ (at an instant t'7) from the inertia phase start detection instant t4 without detecting an end of the inertia phase. The shift control system continues the forcible pressure increase at the gradient α1 until an end (t'8') of a time period $T_D$ from the instant t'. The time period $T_D$ is set to a value $T_{D1}$ for the abnormal state control mode at step 40. At the shift operation end instant t'8, the shift control system terminates the shift operation, and increases the engagement side fluid pressure to the maximum value steeply.

At step 42 following step 40, the shift control system increases the engagement side command fluid pressure at the gradient (or rate) α1 in the abnormal state control mode. The gradient α1 in the abnormal state control mode is more gradual than a gradient α2 set in step 41 for the normal state control mode. By using the gradual rate α1, the shift control system can prevent an undesired shift shock. When an abnormal condition is detected at step 36~38, there possibly remains the inertia to be absorbed before the speed ratio between the input revolution speed and the output revolution speed is brought to the end state of the shift operation. A forcible increase in the engagement side fluid pressure at the relatively steep gradient α2 in the normal state control mode would produce an undesired shift shock. The gradient α1 is set to a smaller value to prevent such a shift shock.

On the other hand, step 41 sets the mode of control to the normal state control mode by setting the pressure increase gradient α to the value α2, and setting the control time $T_D$ to a value $T_{D2}$ for the normal state control mode. With the normal state gradient value α2 and the normal state control time value $T_{D2}$, the shift control system is set to increase the engagement side fluid pressure at the relatively steep gradient from an instant t7 when the gear ratio between the input revolution speed and the output revolution speed becomes lower the inertia phase end detection gear ratio (which, in this example, is a sum obtained by addition, to the after-shift gear ratio, of an amount determined in consideration of detection error) to a shift operation end instant t8 at which the elapsed time from t7 reaches the control time value $T_{D2}$. The gradient α2 in the normal state control mode is greater than the gradient α1 in the abnormal state control mode. The control time interval $T_{D2}$ for the normal state control mode is shorter than the control time interval $T_{D1}$ for the abnormal state control mode. With the steeper gradient α2 and the shorter control time interval $T_{D2}$, the shift control system can terminate the shift operation securely by increasing the engagement side capacity quickly after the normal end of the inertia phase is detected, and thereby become ready to respond to a next shift command immediately.

Figure 5:
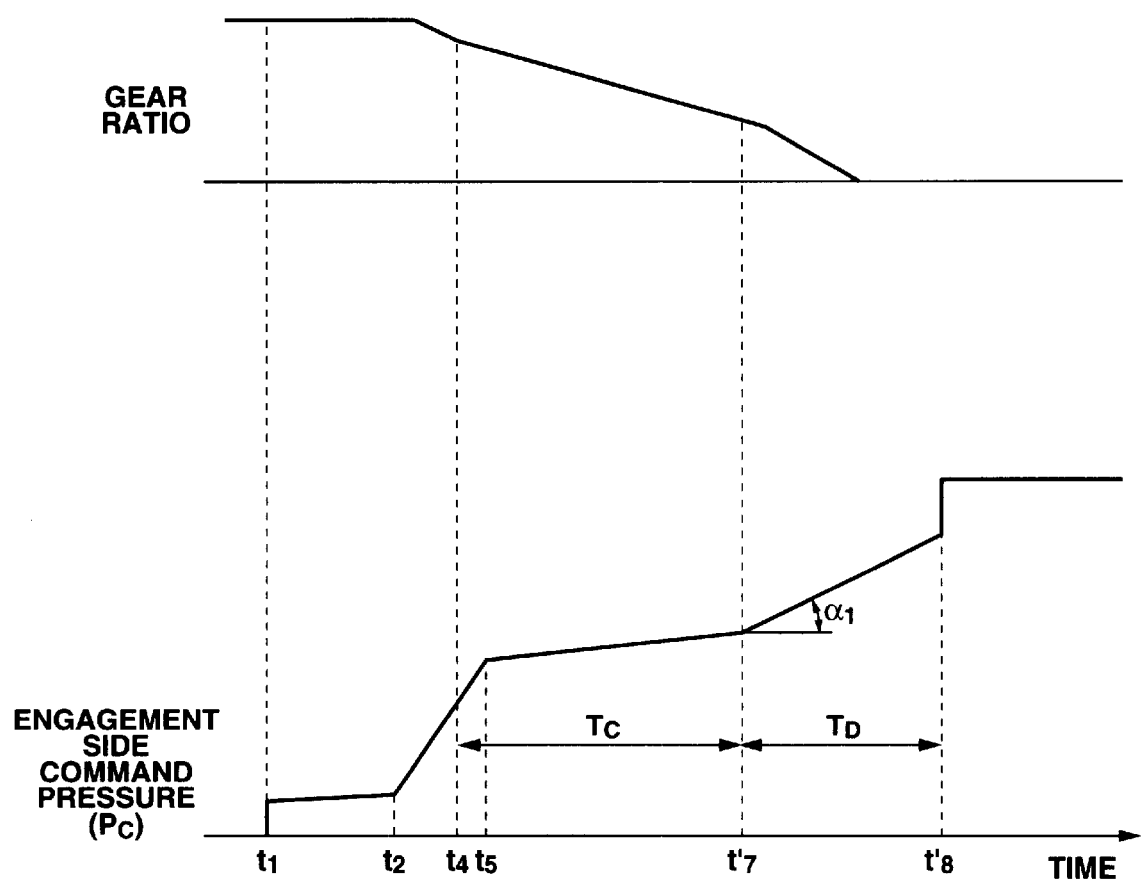
FIG. 5 is a time chart showing the engagement side command fluid pressure varied in a manner of time series by the program of FIG. 4 when the end of the shift operation is not normal.
Figure 6:
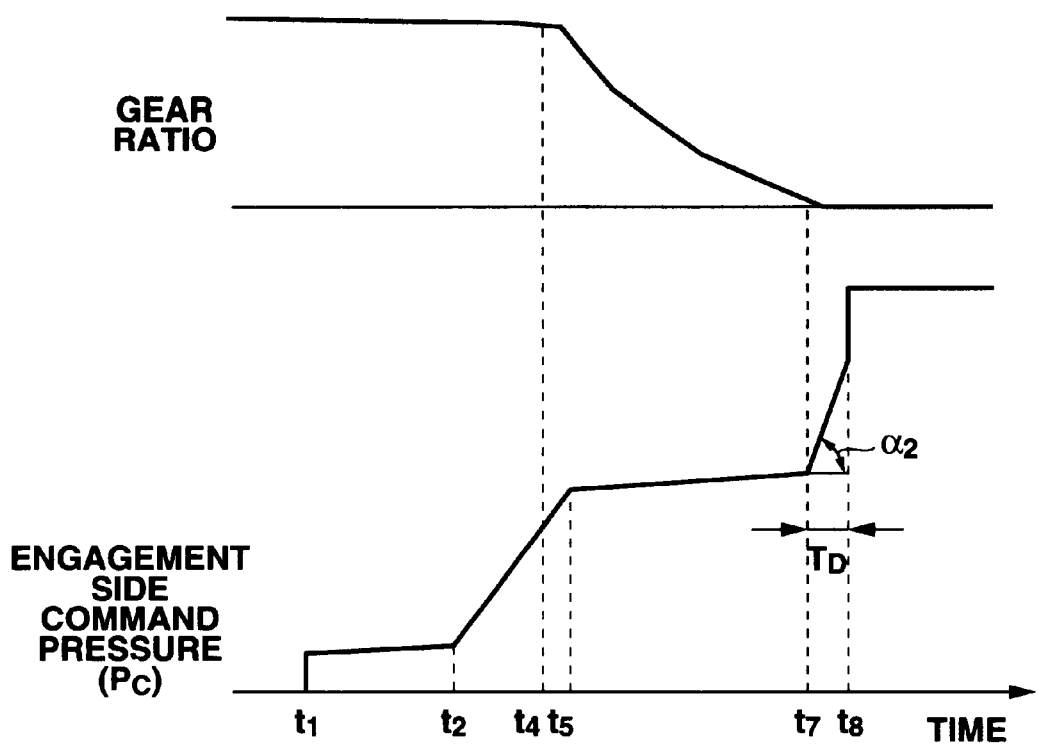
FIG. 6 is a time chart showing the engagement side command fluid pressure when the end of the shift operation is normal.

At step 42, the shift control system increases the engagement side fluid pressure and decreases the disengagement side fluid pressure with the pressure gradient and the control time which are set at the previous step 40 or 41. Thus, the engagement side fluid pressure $P_C$ is increased at the gradual rate α1 in the longer period $P_D$ after the detection of an end of an inertia phase in the abnormal state control mode as shown in FIG. 5. In the normal state control mode as shown in FIG. 6, the engagement side fluid pressure $P_C$ is increased steeply at the steeper rate α2 in the shorter period after the detection of end of an inertia phase.

Further, at step 43 following step 42, the controller 14 adds the predetermined time increment ΔT to a variable T4 to count an elapsed time interval. The variable T4 is intended to determine a time interval from the aforementioned t7 to the shift operation end instant t8. At a following step 44, it is checked if the time interval T4 is more than the predetermined time interval $T_D$ to check if the end process of the shift operation has completed. If the measured time interval T4 is more than the time interval $T_D$, the controller 14 determines at step 45 that the shift operation has ended and terminates the program. On the other hand, if the time interval T4 is less than or equal to the time interval $T_D$, the controller 14 terminates the program immediately.

The shift control system of this example controls the disengagement side fluid pressure in the abnormal state control mode or in the normal state control modes in the same manner by setting the pressure decreasing gradient to a gradual rate for the abnormal state control mode or to a steeper rate for the normal state control mode.

In recapitulation, the shift control apparatus according to the present invention monitors the progress of the replacement shift operation to detect an abnormal condition, and adapts the mode of the final stage of the shift control to the normal state or the abnormal state.

Thus, the shift control system examines whether specified events occur in a timely manner in the progress of a shift operation, and thereby detects an abnormal condition immediately. Therefore, the shift control system can perform a control action adapted to the abnormal condition immediately and prevents an undesired shift shock adequately.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

The present application is based on a Japanese Patent Application No. 2000-282341, filed in Japan on Sept. 18, 2000. The entire contents of the Japanese Patent Application No. 2000-282341 are hereby incorporated by reference.

What is claimed is:

1. A shift control apparatus for an automatic transmission comprising first and second friction engagement elements to be selectively engaged and disengaged to select one of gear ratios, the shift control apparatus comprising a shift controller configured:

to govern a first shift operation to effect a first gear shift by engaging the first friction element by increasing a first fluid pressure and instead by disengaging the second friction element by decreasing a second fluid pressure;

to measure a time from a start of an inertia phase in the first gear shift;

to check if an end of the inertia phase is not detected within a predetermined first time interval from the start of the inertia phase; and to forcibly increase the first fluid pressure at a predetermined gradual rate if an end of the inertia phase is not detected within the predetermined first time interval from the start of the inertia phase.

2. The shift control apparatus as claimed in claim 1, wherein the shift controller is configured to measure a time from a start of the first shift operation, to check if a start of the inertia phase is not detected within a predetermined second time interval, and to vary the first and second fluid pressures by forcibly increasing the first fluid pressure at a predetermined increasing rate and by forcibly decreasing the second fluid pressure at a predetermined decreasing rate if a start of the inertia phase is not detected within the predetermined second time interval.

3. The shift control apparatus as claimed in claim 1, wherein the shift controller is configured to measure a time from a start of the first shift operation, to check if an end of the first shift operation is not detected within a predetermined third time interval, and to vary the first and second fluid pressures by forcibly increasing the first fluid pressure at a predetermined increasing rate and by forcibly decreasing the second fluid pressure at a predetermined decreasing rate if an end of the first shift operation is not detected within the predetermined third time interval.

4. The shift control apparatus as claimed in claim 1 wherein the shift controller is configured to produce a first condition signal if an end of the inertia phase is not detected within the predetermined first time interval from the start of the inertia phase, and to respond to the first condition signal by varying the first and second fluid pressures in a special state control mode in which the first fluid pressure is forcibly increased at a predetermined increasing rate during a predetermined increasing period and the second fluid pressure is decreased at a predetermined decreasing rate during a predetermined decreasing period, the predetermined increasing and decreasing rates and the predetermined increasing and decreasing periods being so determined that the first gear shift is brought to an end and the gear ratio of the automatic transmission is settled to an after-shift state.

5. A shift control system for a vehicle, comprising:

an automatic transmission comprising a friction element group of a plurality of friction engagement elements to be selectively engaged and disengaged to select one of gear ratios; and a shift controller configured:

to govern a first shift operation to effect a first gear shift by engaging a first element of the friction element group by increasing a first fluid pressure for the first element and instead by disengaging a second element of the friction element group by decreasing a second fluid pressure for the second element;

to measure a start-to-end time from a start of an inertia phase in the first gear shift to an end of the inertia phase distinguished by an effective gear ratio between a transmission input speed and a transmission output speed;

to produce a first condition signal if the start-to-end time is greater than a predetermined first amount; and to control the first and second fluid pressures in a normal state control mode when the first condition signal is absent: and to control the first and second fluid pressures in a special state control mode when the first condition signal is present.

6. The shift control system as claimed in claim 5, wherein the shift controller is configured to produce a first shift command to command the first gear shift in the automatic transmission; to measure a command-to-start time from the first shift command to a start of the inertia phase; to produce a second condition signal if the command-to-start time is greater than a second predetermined amount; and to control the first and second fluid pressures in the special state control mode if at least one of the first and second condition signals is present.

7. The shift control apparatus as claimed in claim 6, wherein the shift controller is configured to measure a command-to-end time from the first shift command to an end of the inertia phase; to produce a third condition signal if the command-to-end time is greater than a predetermined third amount, and to control the first and second fluid pressures in the speical state control mode if at least one of the first, second and third condition signals is present.

8. A shift control process for an automatic transmission with a friction element group and an actuator for governing a first shift operation to effect a first gear shift by engaging a first element of the friction element group by increasing a first fluid pressure for the first element and instead by disengaging a second element of the friction element group by decreasing a second fluid pressure for the second element, the shift control process comprising:

a step of measuring a start-to-end time from a start of an inertia phase in the first gear shift to an end of the inertia phase distinguished by an effective gear ratio between a transmission input speed and a transmission output speed;

a step of producing a first condition signal if the start-to-end time is greater than a predetermined first amount; and a step of controlling the first and second fluid pressures in a normal state control mode when the first condition signal is absent, and in a special state control mode when the first condition signal is present.

* * * * *